Aug. 26, 1952 — H. G. CAMNER — 2,608,208
PRESSURE REDUCTION VALVE
Filed Sept. 15, 1948
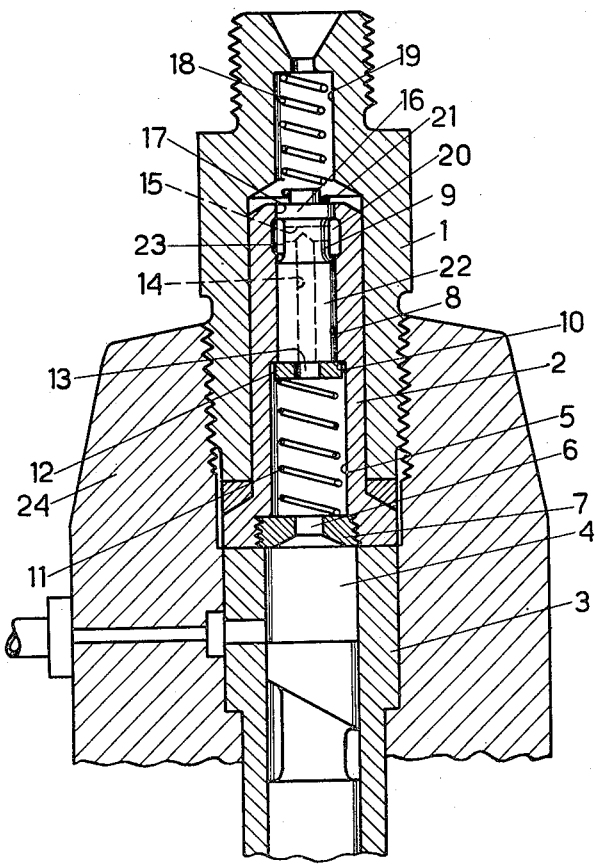
Inventor
Hilding Gunnar Camner
By James C. Mack
his Attorney Patented Aug. 26, 1952

2,608,208

UNITED STATES PATENT OFFICE 2,608,208

PRESSURE REDUCTION VALVE

Hilding Gunnar Camner, Storangen, Sweden, assignor to Aktiebolaget Atlas Diesel, Sickla, near Stockholm, Sweden, a corporation of Sweden Application September 15, 1948, Serial No. 49,355
In Sweden September 18, 1947

4 Claims. (Cl. 137—493)

This invention relates to improvements in pressure reduction valves for fuel injection devices permitting flow of a fuel in two directions in a fuel conduit. The invention is a modification of or supplemental to my co-pending U. S. patent application Ser. No. 750,816, now U. S. Patent No. 2,591,401, issued April 1, 1952. The pressure reduction valve according to the invention comprises a valve housing, a passage in said valve housing forming a portion of a fuel conduit, an annular cylindrical sealing surface formed in said passage, a valve member movable in the longitudinal direction of the passage having an annular cylindrical valve surface cooperating in a certain position of said valve member with said sealing surface to form a seal, a seat in the passage, a spring-loaded member movable in the longitudinal direction of the passage and forced towards said seat by the spring-load and tending to move the valve member to said position in which said valve surface cooperates with the sealing surface to form a seal, a duct through said spring-loaded member forming a portion of the passage, a duct through the valve member also forming a portion of the passage, and by-pass chambers in the passage before and after the annular sealing surface forming portions of the passage serving to by-pass the annular valve surface when said valve surface is displaced into any one of said chambers.

In the accompanying drawing one embodiment of the invention is illustrated by way of example. The figure is an axial section through a portion of the cylinder of a fuel injection pump and of a pressure reduction valve connected therewith.

The illustrated pressure reduction valve consists of a valve housing formed by a nut 1 and a sleeve 2 inserted therein which is kept pressed towards the cylinder 3 of a fuel injection pump by screwing the nut 1 into the housing 24 of the fuel injection pump. The sleeve 2 and the nut 1 form a passage which is a portion of a fuel conduit from the pressure chamber 4 of the fuel pump to a not illustrated fuel injection valve. The sleeve 2 is provided with a bore 5 communicating with the pressure chamber 4 through a duct 6 in a washer 7 screwed into the bottom of the sleeve. The bore 5 is followed by a somewhat smaller bore 8 in which a piston valve generally designated by 9 is guided by means of a guide portion 22 which in the illustrated embodiment is cylindrical. The junction between the bore 5 and the bore 8 is formed by an annular seat 10 on which a spring-loaded washer 12 is normally pressed by a spring 11. The washer 12 has a central duct 13 forming a portion of the passage through the pressure reduction valve and communicating with ducts 14, 15 in the piston valve 9 which also form a portion of the passage and extend from the end of the piston valve forcing the washer 12 and open in an annular groove 23 on the piston valve. Above said groove the piston valve forms an annular cylindrical valve surface 16 which in the illustrated position forms a seal with a corresponding annular cylindrical sealing surface 17 formed in the sleeve 2. A soft spring 18 is provided between the piston valve and the bottom of a bore 19 in the nut 1, said spring serving to keep the piston valve pressed towards the washer 12. An annular chamber 20 is formed in the sleeve 2 below the sealing surface 17 and when the piston valve 9 has been displaced against the action of the spring 11 so far that the valve surface 16 is clear of the sealing surface 17 said chamber forms a by-pass through which fuel may flow in the direction towards the pressure chamber 4 of the pump. Above the sealing surface 17 the nut 1 forms an annular chamber 21 permitting by-pass of fuel from the pressure chamber 4 of the pump when the piston valve is displaced by the fuel pressure against the action of the spring 18 so far upwardly that the valve surface 16 is clear of the sealing surface 17.

The embodiment of the invention described hereinabove and illustrated in the drawing should only be considered as an example and the details of the invention may be modified in several different ways within the scope of the claims.

What I claim is:

1. A pressure reduction valve for fuel injection devices permitting flow of fuel in two directions in a fuel conduit and comprising a valve housing, a passage in said valve housing forming a portion of the fuel conduit, a continuous annular cylindrical sealing surface formed in said passage, a valve member movable in the longitudinal direction of the passage having a piston portion defined by a continuous annular cylindrical valve surface cooperating in a certain position of said valve member with said sealing surface to form a fluid tight seal, a seat in the passage, a spring-loaded member movable in the longitudinal direction of the passage and forced towards said seat by the spring load and engaging the valve member to move the latter to said position in which said valve surface cooperates with the sealing surface to form a seal, a duct through said spring-loaded member forming a portion of the passage, a duct in the valve member forming a portion of the passage, and annular by-pass chambers in the passage having larger diameters and lengths than the annular valve surface and disposed before and after the annular sealing surface forming portions of the passage serving to by-pass the annular valve surface when said valve surface is displaced into either one of said chambers, said duct in the valve member terminating in the chamber closest to said spring-loaded member.

2. A pressure reduction valve according to claim 1, in which the valve member is provided with a guide portion with the same diameter as the annular valve surface and separated from said surface by an annular groove, from which the duct in the valve member extends to the end of the valve member facing the spring-loaded member.

3. A pressure reduction valve according to claim 1, including a spring acting on the valve member in opposition to the action of the spring load on the spring-loaded member in all positions of the valve member.

4. A pressure reduction valve for fuel injection devices permiting flow of fuel in two directions in a fuel conduit and comprising a valve housing, a passage in said valve housing forming a portion of the fuel conduit, a continuous annular cylindrical sealing surface formed in said passage, a valve member movable in the longitudinal direction of the passage having a piston portion defined by a continuous annular cylindrical valve surface cooperating in a certain position of said valve member with said sealing surface to form a fluid tight seal, a seat in the passage, a spring-loaded member movable in the longitudinal direction of the passage and forced towards said seat by the spring load and engaging the valve member to move the latter to said position in which said valve surface cooperates with the sealing surface to form a seal, annular by-pass chambers in the passage having larger diameters and lengths than the annular valve surface and disposed before and after the annular sealing surface and defining the sealing surface and forming portions of the passage serving to by-pass the annular valve surface when said valve surface is displaced into either one of said chambers, and a duct in the valve member forming a portion of the passage and communicating with the one of the by-pass chambers closest to said spring-loaded member.

HILDING GUNNAR CAMNER.

REFERENCES CITED

The following references are of record in the file of this patent:

UNITED STATES PATENTS

| Number | Name | Date |
|---|---|---|
| 1,856,996 | Heise | May 3, 1932 |
| 2,033,839 | Lawson | Mar. 10, 1936 |
| 2,090,781 | Camner | Aug. 24, 1937 |